United States Patent [19]

Takahashi

[11] 4,200,002
[45] Apr. 29, 1980

[54] PARKING BRAKE MECHANISM FOR MOTOR VEHICLE EQUIPPED WITH POWER TRANSMISSION WITH TORQUE CONVERTER

[75] Inventor: Kotei Takahashi, Tokyo, Japan

[73] Assignee: Nissan Motor Company, Limited, Yokohama, Japan

[21] Appl. No.: 819,451

[22] Filed: Jul. 27, 1977

[30] Foreign Application Priority Data

Jul. 28, 1976 [JP] Japan .............................. 51-99607[U]

[51] Int. Cl.² .............................................. G01P 3/18
[52] U.S. Cl. ....................................... 74/530; 188/69; 192/4 A
[58] Field of Search ................ 192/4 A; 74/462, 577, 74/575, 530; 188/69, 60, 71.4, 71.7

[56] References Cited

U.S. PATENT DOCUMENTS

| | | | |
|---|---|---|---|
| 2,317,344 | 4/1943 | Hood | 188/69 |
| 2,875,856 | 3/1959 | Mrlik et al. | 192/4 A |
| 3,990,541 | 11/1976 | Dobrinska et al. | 192/4 A |
| 4,031,977 | 6/1977 | Grosseau | 192/4 A |

FOREIGN PATENT DOCUMENTS 14933 of 1893 United Kingdom ...................... 188/69

Primary Examiner—Albert W. Davis
Assistant Examiner—Wesley S. Ratliff, Jr.
Attorney, Agent, or Firm—Schwartz, Jeffery, Schwaab, Mack, Blumenthal & Koch

[57] ABSTRACT

A tooth formed on a brake pawl has, at a portion facing the outer peripheral surface of a brake gear coaxially mounted on the output shaft of the transmission, first and second inclined surfaces which are bounded by an intersectional line parallel to the axis of the output shaft. The inclination angle of each surface with respect to a tangent line passing through a point where the intersectional line is in contact with a circular path swept out by the outer peripheral surface of teeth formed on the brake gear is greater than zero degrees. With this, the brake pawl is pushed way from its engaged condition due to collisions between shoulder portions of the teeth and one of the first and second inclined surfaces above a predetermined vehicle speed.

1 Claim, 9 Drawing Figures

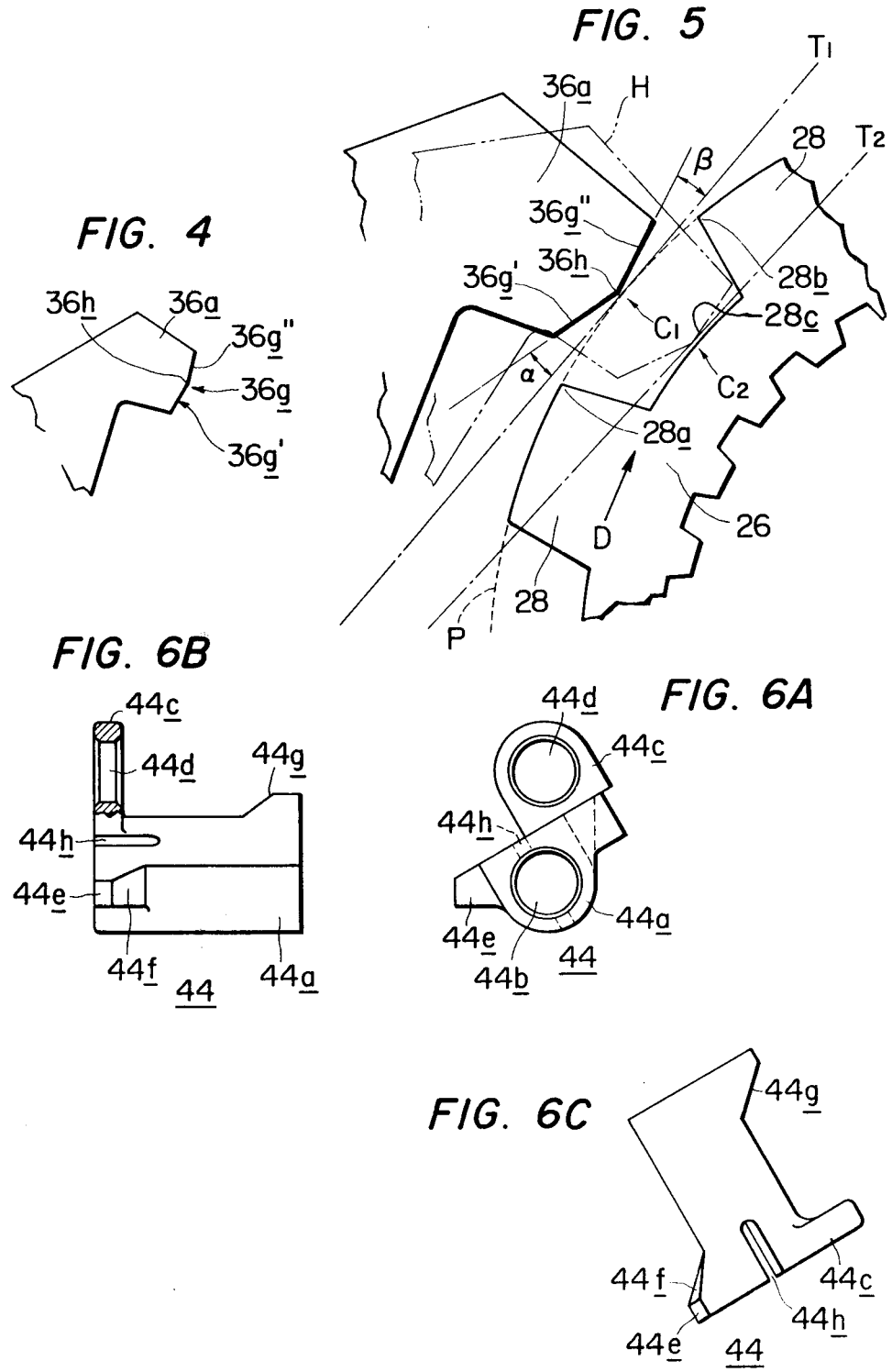

PARKING BRAKE MECHANISM FOR MOTOR VEHICLE EQUIPPED WITH POWER TRANSMISSION WITH TORQUE CONVERTER

FIELD OF THE INVENTION

The present invention relates in general to brakes for a motor vehicle, and more particularly to a parking brake mechanism for use with an automotive power transmission which is connected to the automotive engine through a torque converter.

BACKGROUND OF THE INVENTION

In a motor vehicle having a power transmission powered by an engine through a fluid coupling or a torque converter, it is usual to equip the vehicle with a parking brake mechanism which is capable of anchoring the output shaft of the power transmission when secure parking of the vehicle is required. Usually, the parking brake mechanism comprises a swingable brake pawl having at its one end a tooth, a brake gear having a plurality of external teeth and coaxially mounted on the output shaft of the transmission, and a parking cam for urging the tooth of the brake pawl into engagement with a gap formed between any corresponding two of the teeth of the brake gear in response to shifting of the transmission shift lever into the parking position. However, in the conventional parking brake mechanism of a type mentioned above, it is observed that the tooth of the brake pawl is formed, at a portion facing the outer peripheral surface of the brake gear, with a substantially flat surface. It can, with this kind brake pawl, undesirably occur that just a slight insertion of the tooth into the gap instantly induces complete locking engagement of the tooth with the brake gear to lock the transmission output shaft. This phenomenon will cause a very dangerous situation if by chance miss-shifting of the transmission shift lever into the parking position during high speed running of the vehicle occurs, whereby complete the locking of the output shaft takes place. Doubtless, this is very dangerous, not to mention possible damage to bearings and twisting of torque transmitting shafts throughout the transmission, shattering of teeth on the brake gear and the like.

SUMMARY OF THE INVENTION

Accordingly, the main object of the present invention is to provide a new and improved parking brake mechanism which can eliminate the above-mentioned dangerous operation encountered in the conventional parking brake mechanism.

Another object of the present invention is to provide a new and improved parking brake mechanism in which complete locking of the transmission output shaft is accomplished only when the vehicle is halted or running very slowly.

Still another object of the present invention is to provide a new and improved parking brake mechanism which is compactly constructed thereby requiring a minimum amount of space for accommodation in the transmission housing.

According to the present invention, there is provided a parking brake mechanism for a motor vehicle transmission having a transmission output shaft, comprising brake gear means coaxially mounted on the output shaft for rotation therewith, the means being formed at the periphery thereof with a plurality of external teeth; a brake pawl mounted for rotation about an axis parallel to the axis of the output shaft and carrying thereon a tooth engageable with a gap formed between any corresponding two of the teeth when biased toward the brake gear means; and a parking cam for urging the brake pawl toward the brake gear means when biased in one direction, the tooth being formed at a portion facing the outer peripheral surface of the brake gear means with first and second inclined surfaces which are bounded by an intersectional line parallel with the axis of the output shaft, the inclination angle of each of the first and second inclined surfaces with respect to a tangent line passing through an imaginary point where the intersectional line is in contact with a circular path swept out by the outer peripheral surface of the teeth being greater than zero degrees.

BRIEF DESCRIPTION OF THE DRAWINGS

Other objects and advantages of the present invention will become more clearly understood from the following detailed description when taken in conjunction with the accompanying drawings, in which:

FIG. 4 is a partial but enlarged sectional view of a tooth formed on the brake pawl shown in FIGS. 3A and 3B;

FIG. 5 is a view showing a positional relation between a tooth of the brake pawl and a gap formed between two adjacent teeth of the brake gear;

FIGS. 6A, 6B and 6C are respective side, plan and back views of a parking cam also employed in the mechanism of the invention.

DESCRIPTION OF THE PREFERRED EMBODIMENT

Figure 1:
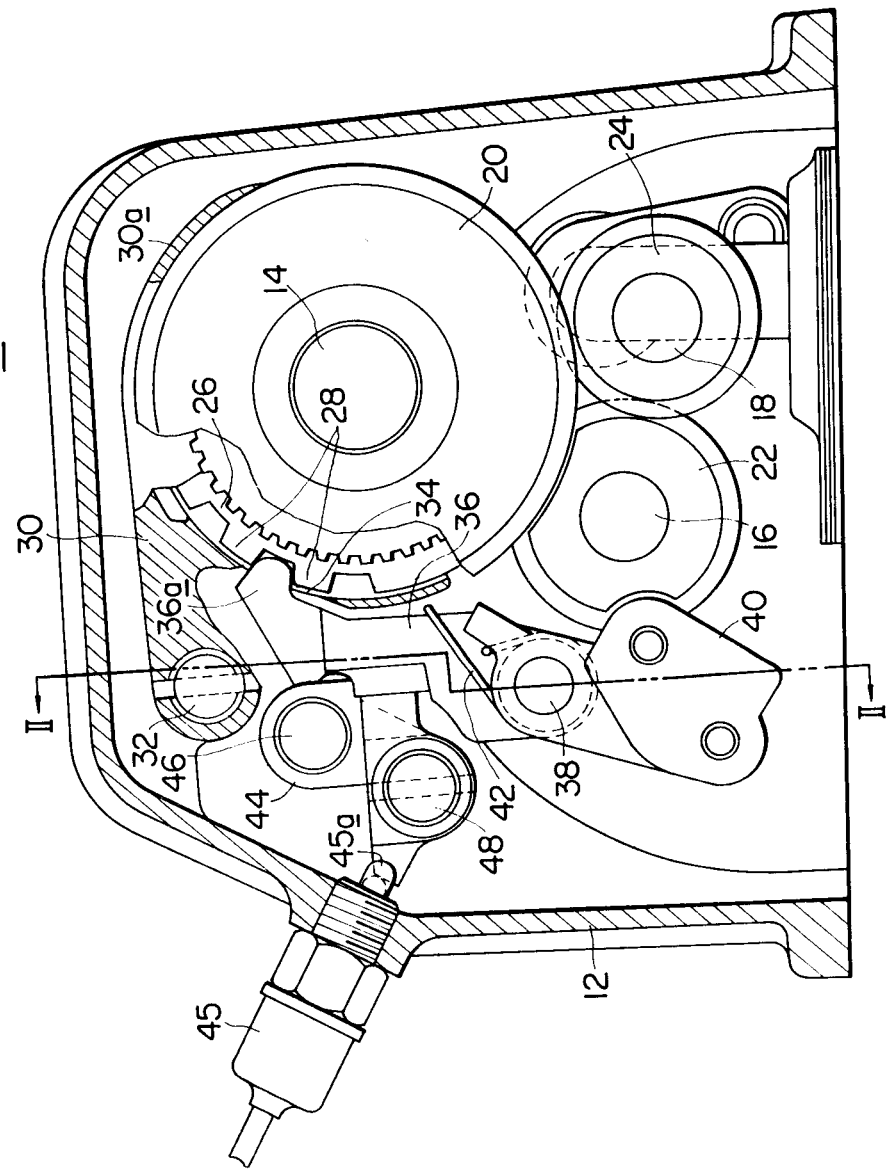
FIG. 1 is a partial cross section view of a motor vehicle power transmission equipped with an improved parking brake mechanism according to the present invention.

Referring to FIG. 1 of the drawings, there is illustrated a power transmission which is generally designated by a reference numeral 10 and includes therein an improved parking brake mechanism according to the invention. Although not shown in the drawings, the transmission 10 is connected to an automotive engine via a fluid coupling or a torque converter.

The transmission 10 generally comprises a transmission housing 12 in which an output shaft 14, a countershaft 16 and a reverse idler shaft 18 are parallelly mounted. Output shaft gears 20, countershaft gears 22 and reverse idler gears 24 are operatively and respectively mounted around the output shaft 14, the counter shaft 16 and the reverse idler shaft 18 in a conventional manner. In the drawing, however, only one gear in each group is shown for facilitation of the following description. It should be appreciated that in the illustrated condition of the transmission, the engine power from the torque converter is transmitted through the countergear 22 to the reverse idler gear 24 and to the output shaft gear 20. By shifting a coupling sleeve 26 along the axis of the output shaft 14 in a given direction, synchronization in rotational speed between the output shaft gear 20 and a hub (not shown) fixed to the output shaft 14 is completed to provide a secure connection between them thus transmitting the power of the output shaft gear 20 to the output shaft 14.

The coupling sleeve 26 is formed at its periphery with a plurality of external teeth 28. As will be apparent hereinafter, the exteriorly toothed coupling sleeve 26 acts as a parking gear. The coupling sleeve 26 is moved to and fro on the output shaft 14 by means of a shifting fork 30 which is fixed to a first fork shaft 32 and has a branched fork portion 30a covering half the toothed periphery of the coupling sleeve 26 so that the axial movements of the first fork shafts 32 induce to and fro movements of the coupling sleeve 26. Although not well shown in the drawing, the fork portion 30a is relatively wide. An opening 34 is formed in the fork portion 30a at a position just facing the toothed periphery of the coupling sleeve 26.

A brake pawl 36 is mounted on a support shaft 38 for oscillation into and out of engagement of a tooth 36a thereof with a gap formed between any corresponding two of the teeth 28 on the coupling sleeve 26. This oscillation is carried out by passing the tooth 36a through the opening 34. The support shaft 38 is rotatably supported by a bracket 40 which has a pair of projections 40a with respective through holes (no numerals) through which the support shaft 38 is passed, as is clearly shown in FIG. 2. The bracket 40 is firmly connected to the housing 12 by suitable means such as bolts and nuts (no numerals). The brake pawl 36 is biased by a return spring 42 in a direction to separate the tooth 36a from the teeth 28 on the coupling sleeve 26. Thus, as will be clear hereinafter, the locking engagement between the tooth 36a and the gap of the teeth 28 is achieved only when the brake pawl 36 is urged toward the teeth 28 against the force of the return spring 42 in response to movement of a later-mentioned parking cam (44).

Figure 3A:
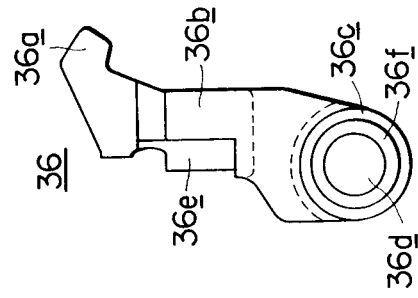
FIGS. 3A and 3B are respective side and plan views of a brake pawl employed as a part of the parking brake mechanism of the invention.
Figure 3B:
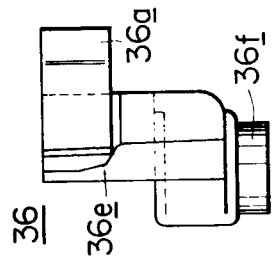
Figure 2:
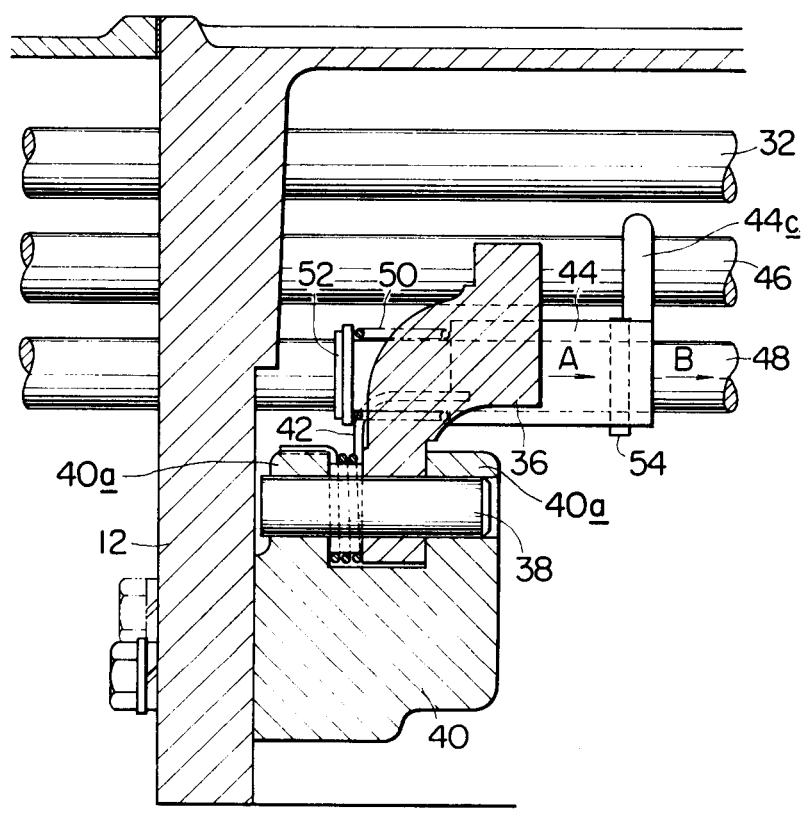
FIG. 2 is a view taken along the line II—II shown in FIG. 1.

As well shown in FIGS. 3A and 3B, the brake pawl 36 is formed with a shank portion 36b between the tooth 36a and a hub portion 36c which has a through hole 36d through which the above-mentioned support shaft 38 is passed. Further, the shank portion 36b is formed at its outer side opposite to the tooth 36a with a cam surface 36e which is adapted to engage with another cam surface (44g) formed on the parking cam (44). Indicated by a numeral 36f is a small diameter portion of the hub portion 36c around which multiple turns of the return spring 42 are disposed as best seen in FIG. 2.

According to the present invention, the following consideration is further taken with respect to the configuration of the tooth 36a of the brake pawl 36. As seen in FIG. 4, the tooth 36a has formed, on the surface portion generally denoted by 36g and which faces the periphery of the exteriorly toothed coupling sleeve 26, first and second inclined sections or surfaces 36g' and 36g" which define an intersectional line 36h passing substantially parallel to the axis of the support shaft 38 (see FIG. 1).

In FIG. 5, a detailed configuration of the surface portion 36g of the tooth 36a is shown in cooperation with the teeth 28 on the coupling sleeve 26. A tangent line which passes through an imaginary point $C_1$ where the intersectional line 36h of the tooth 36a is in contact with a circular path P swept out by the outer peripheral surfaces of the teeth 28 is designated by a reference $T_1$. In this situation, the first and second inclined sections 36g' and 36g" form respectively inclination angles $\alpha$ and $\beta$ with respect to the tangent line $T_1$.

With this configuration, the following phenomena will occur between the brake pawl 36 and the exteriorly toothed coupling sleeve 26 during their operational movements. Under rotation of the coupling sleeve 26 at a certain speed in a direction indicated by arrow D, the insertion of the tooth 36a into the gap of the teeth 28 is surely prevented due to a collision or collisions occurring between a shoulder portion 28a of any of the teeth 28 and the first inclined section 36g', the collision causing the brake pawl 36 to be sharply pushed away from its semi-engaged position. Under reverse rotation of the coupling sleeve 26, the collision between another shoulder portion 28b of any of the teeth 28 and the second inclined section 36g" also prevents the tooth 36a from being inserted into the gap. Theoretically, it is sufficient to arrange for each of the angles $\alpha$ and $\beta$ to be greater than zero degrees in order to achieve the above-mentioned brake pawl separation phenomenon. Preferably, the formation of the second inclined section 36g" is made so that when the tooth 36a of the brake pawl 36 is completely engaged with the gap of the teeth 28, as indicated by a phantom line H, a tangent line $T_2$ of a circular bottom land 28c of the gear 28 passing through a point $C_2$ at which the intersectional line 36h contacts the land 28c lies in the second inclined section 36g". However in actual practice, the degree of the angle must be determined by taking into consideration the distance between the brake pawl 36 and the output shaft 14, and the critical vehicle speed at which the output shaft 14 is lockable without inducing a dangerous situation to occur. In this embodiment, the angles are about 4.75 degrees wherein the locking of the output shaft 14 is achieved when the vehicle speed is below about 8 km/h.

Referring back to FIG. 2, the parking cam 44 is shown as cooperating with second and third parallel fork shafts 46 and 48 which are axially slidably disposed in the casing 12 and are parallel with respect to the before-mentioned fork shaft 32. These fork shafts 46 and 48 as well as the shaft 32 carry thereon their corresponding shifting forks (not shown) and are movable in response to shifting movements of a driver operable transmission shift lever (not shown). In this embodiment, the third fork shaft 48 is a reverse shaft which carries a fork for a reverse output gear (not shown).

As best seen in FIGS. 6A, 6B and 6C, the parking cam 44 includes a body portion 44a having a passage 44b through which the third fork shaft 48 passes. Projecting upwardly from one axial end of the body portion 44a is a ring portion 44c in which an opening 44d is formed. A projection 44e is integrally provided on the one end of the body portion 44a to define an inclined surface 44f at its side, the projection 44e extending substantially perpendicular to the axis of the passage 44b. This projection 44e activates a reversing light switch 45 (see FIG. 1) to illuminate a rear mounted reversing light (not shown) when it depresses a button 45a of the switch 45 via its inclined surface 44f. Projecting from the other axial end of the body portion 44a toward an opposite direction to the projection 44e is a cam surface 44g which is slidably engageable with the before-mentioned cam surface 36e of the brake pawl 36. Indicated by a reference numeral 44h is a cut or slit which is arranged to extend to the one axial end of the body portion 44a along the axis of the passage 44b to traverse the diameter of the same.

Referring once again to FIG. 2, the parking cam 44 is supported by the second and third fork shafts 46 and 48 by allowing the shafts to respectively pass through the opening 44d of the ring portion 44c and the passage 44b of the body portion 44a. The arrangement between the parking cam 44 and the brake pawl 36 is such that the cam surface 44g of the parking cam 44 does not engage with the cam surface 36e of the brake pawl 36 under a condition wherein the tooth 36a of the brake pawl 36 is disengaged from the gap difined between the teeth 28 of the coupling sleeve 26. The ring portion 44c is for preventing the parking cam 44 from rotation about the third fork shaft 48 and for achieving smooth axial movement of the body portion 44a of the parking cam 44 along the shaft 48. For urging the parking cam 44 rightwardly, as viewed along the arrow A shown in the drawing, a coil spring 50 is disposed around the third shaft 48 between the other axial end of the parking cam 44 and a spring seat 52 fixed to the third fork shaft 48. A stop pin 54 is fixedly disposed in a diametrically extending through hole (no numeral) formed in the third fork shaft 48 so as to cooperate with the cut 44h of the parking cam 44 for thereby limiting the axial rightward further movement of the parking cam 44 by the force of the spring 50. Under inoperative or neutral condition of the third fork shaft 48, the cam surface 44g of the parking cam 44 is axially separated from the cam surface 36e of the brake pawl 36 so as not to rotate the brake pawl 36 toward the teeth 28 on the coupling sleeve 26. However, as will be described next, the axial rightward movement of the third fork shaft 48 from its rest condition induces the rotation of the brake pawl 36 toward the teeth 28 in a direction to engage the tooth 36a with the teeth 28 or the gap of the teeth 28.

With the above-described construction of the parking brake mechanism of the invention, the operation thereof is as follows:

While the transmission shift lever (not shown) is positioned at either the driving position or the neutral position, the third fork shaft 48 stays in its rest or neutral position wherein the cam surface 44g of the parking cam 44 is disengaged from the cam surface 36e of the brake pawl 36. Thus, the tooth 36a of the brake pawl 36 is kept separated from the teeth 28 thus permitting the free rotation of the output shaft 14 of the transmission.

At a standstill or when the vehicle is moving very slowly and the shift lever of the transmission is moved by the driver to a parking position, the first fork shaft 32 is moved (or remains stationary) to allow the coupling sleeve 26 to stay in a neutral position wherein the coupling sleeve 26 engages with only the hub (not shown) fixed to the output shaft 14, and simultaneously, the third fork shaft 48 is moved rightwardly, as viewed along the arrow B in FIG. 2. By this movement of the shaft 48, the parking cam 44 is instantly brought into contact at its cam surface 44g with the cam surface 36e of the brake pawl 36 and thus, if the tooth 36a of the brake pawl 36 is in alignment with a gap between the corresponding adjacent two teeth 28 of the coupling sleeve 26, the cam surface 44g rides up the cam surface 36e thereby urging the brake pawl 36 and more specifically the tooth 36a, into engagement with the gap between the teeth 28 against the force of the return spring 42. By this, the output shaft 14 is locked achieving secure locking of the vehicle.

On the other hand, if the tooth 36a is misaligned with the gap of the teeth 28, the riding up operation of the cam surface 44g to the cam surface 36e is stopped when the tooth 36a contacts the peripheral outer surface of one of the teeth 28. In this state, however, the parking cam 44 is constantly applied with the biasing force of the compressed coil spring 50, and thus, the brake pawl 36 is constantly biased to rotate toward the teeth 28. Hence, as soon as the tooth 36a of the brake pawl 36 and the gap of the teeth 28 come into alignment upon slight rotation of the coupling sleeve 26 due to slight movement of the vehicle, the cam surface 44g of the parking cam 44 completely rides upon the cam surface 36e of the brake pawl 36 with a result that the tooth 36a of the brake pawl 36 is inserted into the gap between the teeth 28 thereby locking the coupling sleeve 26 and thus the output shaft 14. Upon complete engagement of the tooth 36a of the brake pawl 36 with the gap, the further axial movement of the parking cam 44 is securely prevented by the stop pin 54 which then contacts the end of the cut 44h of the parking cam 44.

When a release of the parking brake is required, the shift lever of the transmission is shifted back by the driver to the neutral position. By this, the third fork shaft 48 is moved leftwardly in FIG. 2, from the previously set parking position while moving the parking cam 44 leftwardly via the fixed stop pin 22, so that the cam surface 44g of the parking cam 44 is disengaged from the cam surface 36e of the brake pawl 36. Thus, the brake pawl 36 is returned to its original inoperative position by the force of the return spring 42 disengaging the tooth 36a thereof from the gap of the teeth 28 on the coupling sleeve 26. Accordingly, the free rotation of the output shaft 14 is permitted.

Now, the most important characteristic operation encountered in the subject parking brake mechanism will be described next.

When and if the transmission shift lever is accidentally shifted into the parking position due to improper operation by the driver during relatively high speed cruising of the vehicle, the brake pawl 36 with the tooth 36a is forced to rotate toward the gear 28 for the engagement therewith. However, during the rotation of the brake pawl 36, a collision will occur between the shoulder portion 28a of one of the teeth 28 and the first inclined section 36g' of the tooth 36a as has been described hereinbefore, so that the brake pawl 36 is pushed away urging the cam surface 48g of the parking cam 44 against the force of the coil spring 50. Subsequently, the brake pawl 36 is again rotated toward the teeth 28 by the force of the spring 50 against the force of the return spring 42. However, in this instance also, the brake pawl 36 is once again prevented from locking engagement with the gap between the teeth 28 by a further such collision. Consequently, the locking engagement between the tooth 36a and the gap between the teeth 28 is accomplished only when the vehicle speed is reduced to a level wherein the rotational speed of the coupling sleeve 26 is sufficiently low to permit the tooth 36a to enter a gap between the teeth 28. Of course, such oscillation of the brake pawl 36 stops when the shift lever of the transmission is re-shifted to its right position. Under reverse running of the vehicle, substantially the same operation will occur in the subject parking brake mechanism.

From the proceeding description, it will be appreciated that by the parking brake mechanism of the subject invention, the dangerous locking of the output shaft during relatively high speed cruising of the vehicle is assuredly prevented.

It should be also noted that the above-mentioned characteristic operation of the brake pawl 36 is also expected, if the surface of the tooth 36a facing the teeth 28 is entirely flat, and each of the teeth 28 of the coupling sleeve 26 is formed at both shoulder portions thereof with respective inclined surfaces engageable with corresponding edges of the tooth 36a.

What is claimed is:

1. A parking brake mechanism in a motor vehicle transmission having a transmission output shaft, comprising a brake gear coaxially mounted on said output shaft for rotation therewith, said brake gear including at the periphery thereof a plurality of external teeth, a brake pawl mounted for rotation about an axis parallel to the axis of said output shaft and carrying thereon a tooth engageable with a gap formed between any corresponding two of said teeth when biased to lean toward said brake gear, and a parking cam for urging said brake pawl to lean toward said brake gear when biased in a given direction, wherein said tooth of said brake pawl includes thereon first, second, third and fourth surfaces at a portion thereof which substantially enters said gap of said brake gear when said tooth is engaged with said gap for locking said brake gear, said first and second surfaces being inclined with respect to each other and bounded by an intersectional line parallel with the axis of said output shaft and having at opposite positions with respect to said intersectional line respective edges away from which said third and fourth surfaces extend, the inclination angle of each of said first and second surfaces with respect to a tangent line passing through an imaginary point at which said intersectional line is in contact with a circular path swept out by the outer peripheral surface of said teeth being greater than zero degrees, the respective inclination angles of said third and fourth surfaces with respect to said first and second surfaces being selected so that ridges by which said first and third surfaces, and said second and fourth surfaces are bounded are substantially received in said gap when said tooth enters said gap to such a degree as to achieve locking of said brake gear.

* * * * *